Figure 6:
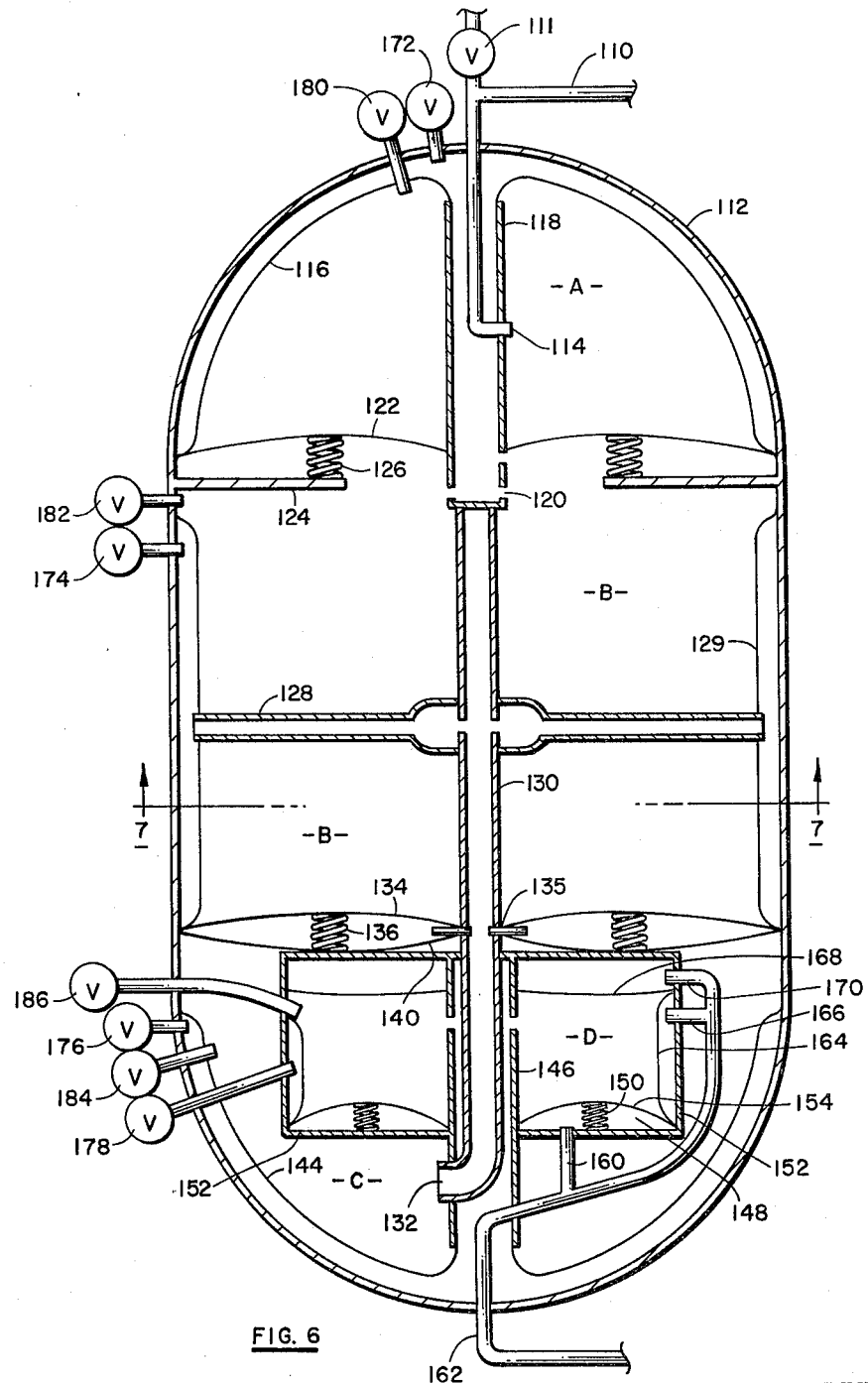

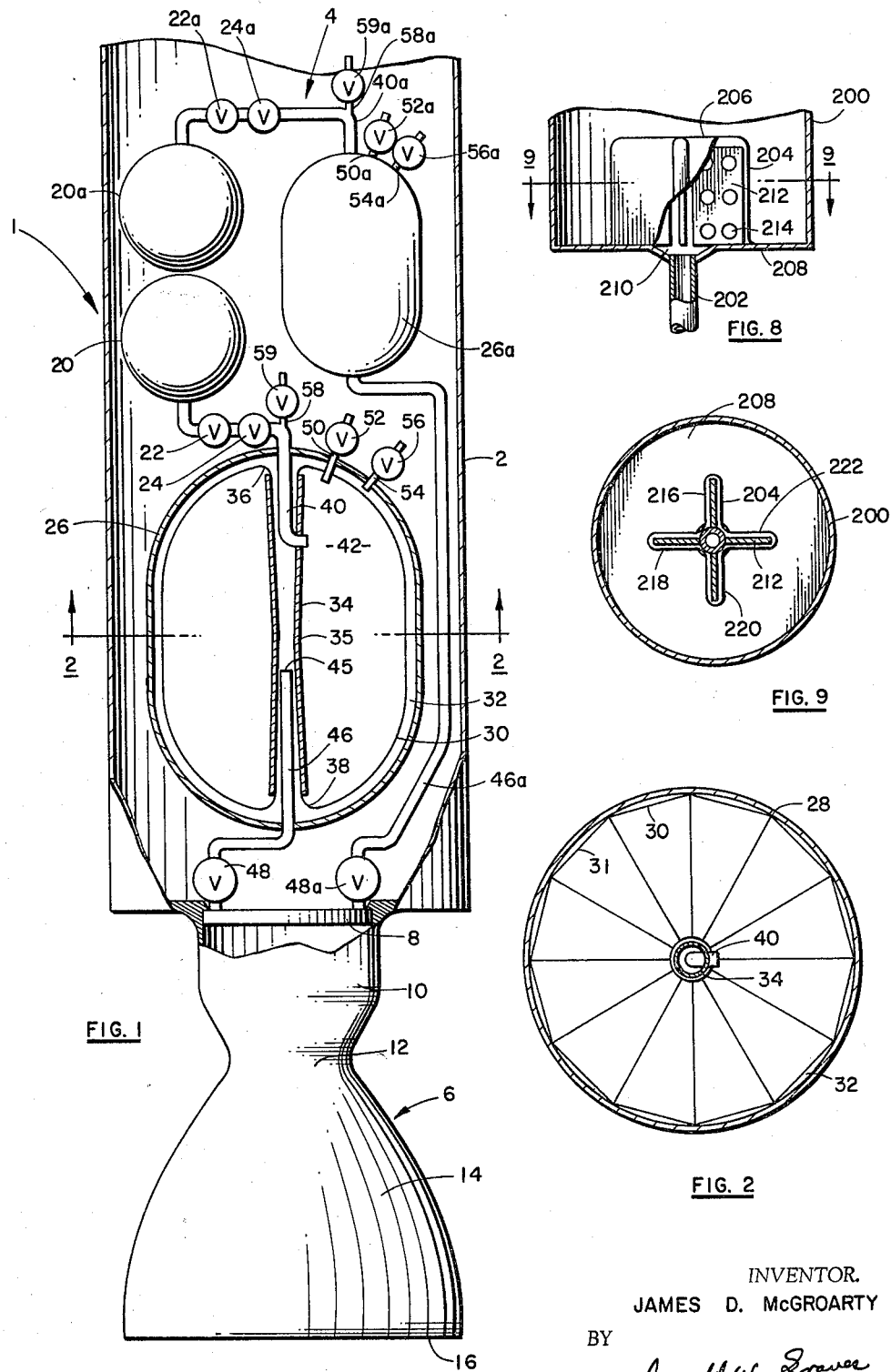

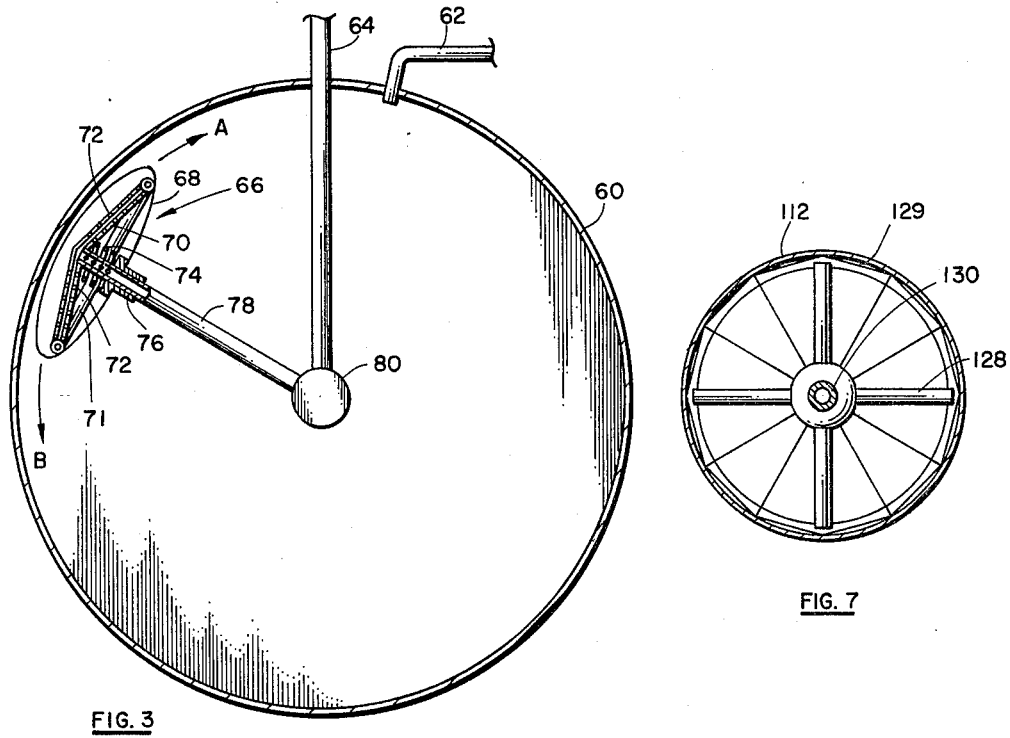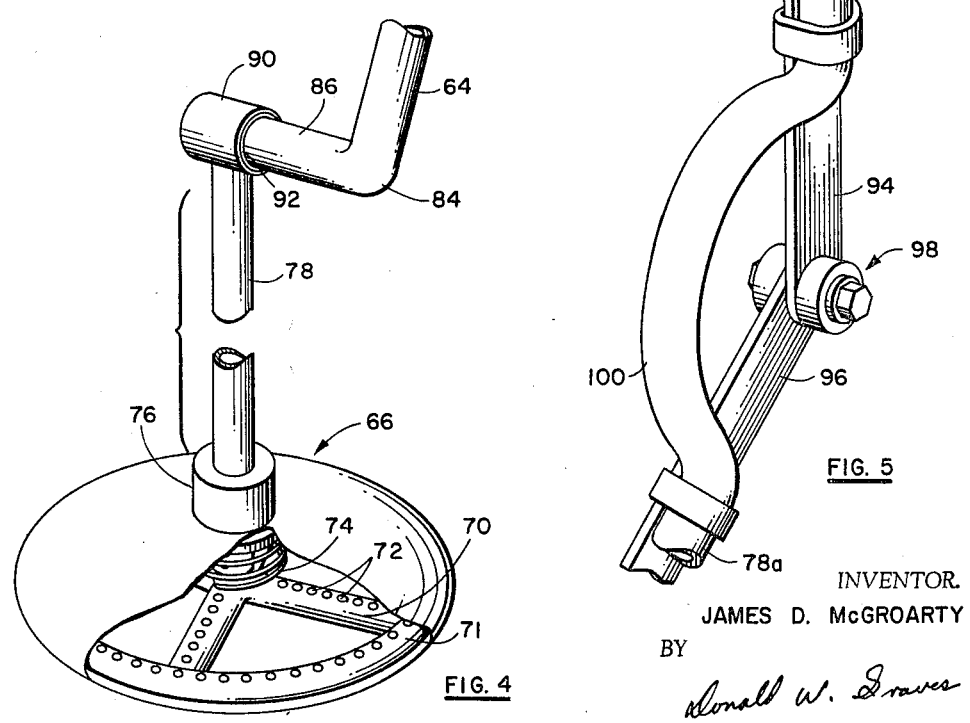

Nov. 22, 1966  J. D. McGROARTY  3,286,463
EXPULSION DEVICE

Filed Aug. 9, 1963  3 Sheets-Sheet 3

INVENTOR.
JAMES D. McGROARTY
BY
Donald W. Graves
ATTORNEY

3,286,463
EXPULSION DEVICE
James D. McGroarty, Hidden Hills, Calif., assignor to
North American Aviation, Inc.
Filed Aug. 9, 1963, Ser. No. 300,971
13 Claims. (Cl. 60—39.48)

This invention relates to expulsion devices for liquids. More particularly, this invention relates to an expulsion device which utilizes the physical phenomenon of the skin or surface tension of liquids for expelling propellants from a tank to the thrust chamber of a rocket engine.

In the field of rocket propulsion, the typical rocket engine is operated by providing a source of propellant, usually fuel and oxidizer, forcing the propellant through an injector under pressure and igniting the propellants to form gaseous products. The gas is accelerated to sonic velocity through a throat section and allowed to expand supersonically in a nozzle to produce thrust. To pressurize the propellant forced into a combustion chamber, it is necessary to provide either a pump system, a gas generator or gas stored under high pressure.

The pump system is advantageous for high thrust engines since the propellants are not under a high initial pressure. If the propellants were stored under an initial high pressure, the propellant tanks would of necessity be too large and heavy to be practical. While the pump system has advantages in large thrust chamber applications, for smaller devices the pump system is complicated and has many moving parts.

The pressure-fed system to which this invention is primarily directed, is most advantageous for small thrust rocket engines as storage tank problems are not as acute as in larger engines. While the pressure-fed system without a separate gas generator is simple, it is often necessary to provide heavy tank walls. In the use of a gas generator, such a system typically includes a solid propellant charge, which upon ignition, produces a gas to force the liquid propellant from the storage tank to the combustion chamber through the injector.

However, one disadvantage of prior art systems which use gas to pressurize the propellants resides in the difficulty in maintaining the pressurizing gas and liquid propellant separate. This separation is required since the gas may be forced into the propellant discharge and injected into the engine, resulting in poor combustion, pressure oscillations, explosions or shut-down. This difficulty is particularly aggravated in space applications due to zero and negative gravity conditions. For example, if the direction of acceleration is such that the liquid propellant no longer covers the discharge port, the pressurizing gas will enter the discharge port.

Approaches to alleviate this and other problems in propellant delivery systems using gas pressurization have been made and include the provision of bladders or diaphragms in the propellant tanks to separate the pressurizing gas and liquid propellant. However, the systems have several disadvantages. For one thing, the bladders or diaphragms must be strong enough to contain the propellant under negative acceleration conditions while at the same time be resilient enough to "follow" the liquid as it is expelled from the tank under pressure from the gas. Also, existing materials are susceptible to tearing or to non-recoverable diffusion of propellants through to the gas side. In addition, with the advent of exotic fuels, the problem of bladder or diaphragm deterioration, particularly with long storage periods, is important and is a big factor in bladder design in addition to those mentioned. Of course, leakage must also be obviated which brings into play such factors as the bladder permeability and seal capability between the bladder and the tank. Finally, if the propellants stored behind the bladder or diaphragm are susceptible to gas formation, it is obvious that even with a bladder or diaphragm effectively separating the propellant or other liquid from the gas, there may still be a problem in gas formation in the liquid which may enter the propellant discharge. This condition is particularly the case with cryogenic propellants such as liquid hydrogen or liquid oxygen which will boil off if insufficient insulation is provided.

It is to obviate many of the problems existent in the prior art that this invention is directed. In its most basic form, the present invention includes a liquid storage and expulsion device which utilizes the surface or skin tension of the stored liquid to effect a barrier between the delivered liquid and the pressurizing gas. Stored liquid is forced through a porous material, a liquid permeable membrane, or a screen under gas pressure, collected in a small volume and delivered to any desired device which in the illustrated embodiments comprises a rocket engine injector. The liquid "wets" the permeable member to prevent gas from passing through the member. The small volume on the discharge side of the barrier will be filled with liquid at all times due to back pressure until the storage volume is depleted. Thus, gas intrusion into the discharge is precluded. As will be described later, more sophisticated embodiments are disclosed.

Accordingly, it is an object of this invention to provide a storage and expulsion system for liquids.

It is a more particular object of this invention to provide a storage and expulsion for liquids such as propellants in which the propellant delivered to the rocket engine is free from gas by means of a barrier wetted or coated by the propellant to prevent the passage of gas because of the surface or skin tension of the propellant.

Other advantages and objects of this invention will become apparent as this description proceeds when taken in conjuction with the drawings in which:

FIG. 1 is a schematic view, partially in cross-section of a propellant storage and expulsion system as used in a missile structure, FIG. 2 is a view along the lines 2—2 of FIG. 1, FIG. 3 is a schematic view, partially in cross-section of another embodiment of this invention, FIG. 4 is a detail of a swivel joint, FIG. 5 is a detail of another swivel joint, FIG. 6 is a schematic view partially in cross-section, of another embodiment of this invention, FIG. 7 is a view along the lines 7—7 of FIG. 6, FIG. 8 is a schematic view partially in cross-section of another embodiment, and FIG. 9 is a view taken along the lines 9—9 of FIG. 8.

Shown in FIG. 1 is a schematic illustration of one embodiment of this invention as it is used in a missile or rocket designated generally as 1. Stored with the body or shell 2 is the propellant storage and expulsion structure of this invention shown generally as 4. The rocket engine or thrust chamber 6 is of a conventional type and produces thrust by the combustion of the propellants therein. The propellants are injected through a conventional injector 8 into a combustion chamber indicated generally at 10. After combustion the gases are accelerated in throat region 12 and allowed to expand in nozzle 14, passing out exit plane 16. The rocket engine so far described is completely conventional and forms no part of this invention.

Shown generally at 4 is the propellant storage and expulsion system according to the invention which replaces the conventional system of pumps or other expulsion devices. Although shown as a bipropellant system, the invention has equal application to monopropellant and multipropellant systems. For brevity, the system 4 is described with reference to only one of the propellants, it being understood that the operation and structure of the other propellant storage and expulsion system is similar. A gas generating device 20 is used to supply the necessary gas pressure to expel the propellant fuel. This gas generator may be a solid charge or a gas stored under high pressure. Gas may also be generated by a controlled propellant change of state such as by heating. Valve 22 is used to shut off flow from the gas generator 20. Preferably, a conventional gas pressure regulator 24 is used in order to reduce the high pressure from the gas generator to a lower constant pressure for even flow.

Liquid fuel, which may be for example a 1:1 mixture of hydrazine and unsymmetrical dimethylhydrazine (UDMH), is stored in propellant tank 26. Spaced from the interior wall of the tank, although in contact at points 28 (see FIG. 2), is a liquid permeable screen 30. Between the screen 30 and the tank 26 are small spaces or collecting manifolds 32. The only way for liquid to pass from inside 42 of screens 30 to the manifolds 32 is through the screens 30. The screen 30, being attached along its length at points 28, may be likened in appearance to a series of "orange peels" between the points 28 due to the shape of the individual segments 31 which comprise the screen 30.

A tube 34 is attached at its ends to portions 36 and 38 of the screen 30 so that liquid in volume 32 is free to enter at either end of tube 34. Gas from gas generator or tank 20 is precluded from entering and collecting in the interior of tube 34 since the gas will traverse tube 34 by means of tube or line 40 into space 42 interiorly of screen 30. Since screen 30 is impermeable to the gas when "wetted," gas will not pass therethrough and thereby enter tube 34. Tube 34 is shown as tapered inwardly toward the center since liquid tends to displace gas at the small end of a cone. Line 46 collects this liquid and discharges it. Open end 45 is shown as being spaced from the center 35 of the tube 34. Since the device is subject to acceleration, the end 45 would be in the center if no acceleration existed. If desired, tube 34 may be straight. Propellant forced through screen 30 by gas pressure will leave space 32 via line 46 and valve 48 into rocket engine 6 by means of injector 8. Thus, it can be seen that by pressurizing volume 42 by gas through line 40, it will force the propellant through screen 30 into spaces 32, tube 34 and line 46 to the combustion chamber 10. To aid in filling tank 26 with propellant, vent line 50, valve 52, vent line 54 and valve 56 are provided. Filling may be accomplished through line 58 and valve 59. As an example of construction utilizing teachings of this invention, tests were run with fuel comprising a 1:1 mixture of hydrazine/unsymmetrical dimethylhydrazine. The oxidizer consisted of nitrogen tetroxide. A source of high pressure gas was led through a pressure regulator into the fuel tank at a pressure of 52.5 p.s.i.g. The tank was filled with the fuel and contained 8.5 liters. At a thrust chamber pressure of 26.2 p.s.i.a., the fuel flow rate was .019 lb./sec. The barrier or screen consisted of a Dutch twill, A.I.S.I. No. 304 stainless steel cloth having 2300 fibers per inch by 325 fibers per inch. The measured pressure drop across the screen was 0.25 p.s.i. The oxidizer, separately led to the thrust chamber, consisted of nitrogen tetroxide and the mixture ratio of fuel to oxidizer was 2.5/1. Oxidizer gas pressure tank 20a, valve 22a, regulator 24a, line 40a, lines 50a, 54a, valves 52a, 56a, tank 26a, line 46a, line 58a, valve 59a and valve 48a operate to supply oxidizer to the combustion chamber in a manner similar to that described with reference to the fuel delivery system.

In FIG. 3, another embodiment of the invention is shown. The environment can be similar to that shown in FIG. 1 but for simplicity is shown with parts of the missile structure missing. As in FIG. 1, pressurization gas enters tank 60 through line 62 and propellant forced out line 64. The fill and vent lines are omitted for simplicity but would be included in the actual structure.

Indicated generally at 66 is the propellant pick up structure. This embodiment is particularly useful when acceleration of the vehicle in different directions is pronounced. The construction of this embodiment insures that gas penetration through the screen because of propellant removal from the surface of the screen is precluded. For example, when an interior portion of the screen such as shown in FIG. 1 is not immersed in liquid, such as may occur during pronounced acceleration and low liquid level, gas may at times pass through the screen as there is no liquid flow through the barrier to limit pressure drop at or below the surface tension capability of the barrier material and liquid. However, liquid tends to collect on the screen even during periods of low liquid storage. The embodiment of FIG. 3 serves to decrease the possibility that the screen will allow gas to pass even when such excessive accelerations exist.

Gas pick-up structure 66 includes a liquid fuel permeable barrier 68 which preferably provides an almost continuous screen for liquid permeability. If desired, this screen may present a permeable barrier on only one face such as that facing wall 60. Inside this barrier 68 is a series of tubes 70 which have apertures 72 for passage of the propellant. Compression spring 74 is biased outwardly against barrier 68 which is backed by member 76 surrounding pipe 78 which is free to move axially thereon. Pipe 78 is rotatable about swivel joint 80 and is free to move in the direction of arrows A and B. One example of a fluid-conveying joint is shown in FIG. 4. Propellant discharge line 64 has a bend 84 terminating in portion 86. The pick-up device 66 is at one end of arm 78. Hollow arm 78 extends into rotatable coupling 90 which rotates on arm 86. Gasket or seal 92 is provided to prevent leakage from inside the junction of lines 78 and 64. While the propellant collection tubes 70 and 71 are shown, these may be replaced by disks having apertures. Instead of one rotatable connection 80, a universal joint to provide even more freedom of movement may be used. This may be done by providing another coupling, similar to 90, on tube 64.

Another means for providing the swivel connection is shown in FIG. 5 which is similar to that shown in FIG. 4 except that instead of providing a propellant delivery rotatable connection, a brace 94 for the propellant discharge line and brace 96 for the pickup structure are rotatably connected together at the joint 98. Joint 98 may be a universal joint if desired. Line 78a leading from the pick-up device is attached to a flexible and hollow tube member 100 which is connected at its other end to propellant discharge line 64a. Thus it can be seen that tube 78a can rotate relative to tube 64a with propellant passing through line 100 therebetween. Referring again to FIG. 3, gas is introduced through line 62 into tank 60. This will pressurize any liquid propellant in the tank and the propellant is collected within pick-up device 66 through barrier 68. The propellant will then pass through apertures 72 in conduit 70 and up tube 78 into propellant discharge line 64 and eventually into the thrust chamber or other delivery point. At any position where a large percentage of the propellant stored within tank 60 is depleted, it can be seen that under certain acceleration vectors, the pick-up device 66 will not be continually immersed in liquid propellant. However, in the event of this acceleration, pick-up device 66 will rotate about the swivel 80 tending to follow the liquid. Since there is friction and a certain mass inertia in pick-up device 66, the liquid is free to travel to the other side of the tank at a faster rate, leaving the pick-up device 66 temporarily subject to a large pressure drop across the barrier. However, by the use of a bias such as spring 74, the permeable barrier 68 will initially deflect or deform under gas pressure which will "squeeze" propellant out tube 78 for the small amount of time that the pickup device 66 is not submerged. This precludes gas intrusion through barrier 68 (since the pressure drop is kept to a minimum) until such time as the pick-up device 66 is again immersed in the liquid. At this time, the bias of spring 74 will force the barrier 68 back into its extended position. Instead of a spring, the barrier 68 may be constructed to be deformable under its own resiliency.

While FIG. 3 has been described with reference to a moveable pick-up, it is within the scope of this invention to provide a stationary pick-up. The stationary pick-up may be located directly over the discharge port and assume any detail such as an axially convoluted barrier around a central stand pipe, or a bellows type convoluted device with convolutions normal to the axis. The pick-up may be elongated to extend along a central axis from one surface of the tank wall diametrally to the opposite wall or over any portions of the tank diameter. An example of a barrier around a central stand pipe is shown in FIG. 8, which is described in detail later.

FIG. 6 illustrates still another embodiment of this invention. This embodiment consists essentially of a series of more than one tank and is particularly useful for vehicles subject to variable and/or higher negative acceleration. In addition, by the use of this series arrangement, the likelihood of gas permeation prematurely through the barriers is lessened to a considerable degree. Designated as 110 is the gas inlet tube from the gas generator or separate gas tank. This will enter tank 112 and into cell A at aperture or apertures 114. Due to pressurization, the liquid propellant in cell A will pass through porous barrier 116 and into tube 118 at the top of tank A (as viewed in FIG. 6) and eventually into tank B through apertures 120. In addition, the liquid propellant is also free to pass into tank B through barrier or screen 122. Biasing devices or springs 126 are provided to hold the barrier 122 in an extended position. These springs are supported on braces 124. Cantilevered leaf springs may perform the same function. Should there be any sudden acceleration or pressure surges such as would occur during transient periods or engine starts, the barrier 122 would deflect downwardly in a manner analogous to a standpipe or accumulator in a hydraulic system to withstand the pressure surges without an excessive pressure differential which would allow gas permeation.

Due to the pressurization, liquid from tank B will enter pipes 128 by passing through porous barrier 129 and into tube 130 and exit at aperture 132 into tank C. In addition, liquid is also free to pass through barriers 134 which as in the case of tank 1 are extended in the position shown by springs 136. As a further precaution in preventing gas from passing into tank C, additional porous barrier 140 is provided. Instead of being porous, it is within the scope of this invention to provide an impervious barrier at this point so that liquid is free to travel into tank C only by means of tube 130. It is further within the scope of this invention that the barriers between tanks A, B and C may be any combination of the above described barriers, or with no load deflecting membrane in some or all cells. Tubes 135 are also provided to allow liquid interiorly of membranes 134 and 140 to pass directly into tube 130. The liquid in tank C will pass through porous barriers 144 and tube 146 into tank D formed in part by impermeable walls 152. A portion of the liquid in tank D will then pass into manifold 148 formed in part by impermeable wall 152 through barrier 154 supported by springs 150. After passage into collecting manifold 148, the propellant will pass into line 160 and out propellant discharge line 162. A portion of the propellant in tank D is also free to pass through barrier 164 and by means of 166 into line 162 and also through porous barrier 168 into line 170. Vent lines and valve assemblies 172, 174, 176 and 178 are provided for venting the propellant during tank filling. Likewise, to further allow the purging of air or gases in the tank during the filling operation, vent lines 180, 182, 184 and 186 are provided. Filling is done through valve and fill line assembly 111.

Thus, it can be seen by this embodiment, the effects of acceleration forces on the propellant tank 112 are minimized through the use of the "standpipe" effect provided by the resiliently supported barriers in each of the tanks. Also, the likelihood of gas permeation through the barriers due to the effects of "non-wet" areas is substantially minimized due to the tanks being in a series relationship. Thus, any gas escaping from tank A, for example, to tank B does not present a problem since liquid is constantly being forced from tank A into tank B and at the same time the liquid in tank B would pass into tank C and eventually into tank D. Tank D is shown as being located interior of and spaced from tank walls 112. This is to provide insulation from the exterior of tank wall 112. For example, should the propellants comprise cryogenic liquids, heat transfer through wall 112 may result in gas formation in cells A, B and C. By insulating tank D as shown, the possibility of gas formation within tank D is substantially lessened. Thus, any gas which may, for example, leak into or be formed within tank C would merely act as a pressurant and the possibility of gas entering propellant discharge line 162 is substantially lessened. Tanks A, B, C and D being initially filled will empty in sequential order. Thus, tank A will be depleted, then tank B, tank C and finally tank D.

Another advantage of the construction shown in FIG. 6 resides in the ability of the multiple barriers to support a greater head than would be possible with a single barrier. Due to the inherent capability of each barrier to withstand only a differential head (as would be experienced in gravitational fields) up to a predetermined amount, the provision of a plurality of discrete barriers increases the amount of propellant (or other liquid) capable of being stored.

FIG. 8 and FIG. 9 illustrate still another embodiment of this invention. A tank wall 200 similar to the previous embodiments is shown and a suitable liquid or liquid propellant discharge line 202 is provided. A porous screen or barrier 204 similar in cross-sectional shape (FIG. 9) to a star or an X is closed at the top by barrier 206 and at the bottom of the tank by tank wall 208. A sump or manifold 210 allows liquid within barriers 204 to be collected and delivered by line 202 to a rocket engine or other structure. For structural rigidity, webs 212 are provided with apertures 214 to allow passage of the liquid from one side of a web to the other. Preferably, the barriers are slightly biased to the position shown but will compress inwardly when subjected to a predetermined differential pressure. This bias may take the form of springs to provide resiliency as in previous embodiments or may consist simply of the inherent resiliency of the barrier itself. As discussed previously with reference to the other embodiments, liquid in tank 200 under pressure from gas will pass through the barriers 204, be collected in sump 210 and delivered under pressure through discharge line 202 to the desired location. By means of this configuration, any excessive surges of pressure in tank 200 (such as from acceleration) will tend to "choke" or force the facing barriers 204 toward each other in one or more of the arms 216, 218, 220 and 222. This will allow the surges to be more readily absorbed.

While this invention has been described with particular reference to a rocket engine, the principles and structures disclosed have equal applicability to any structure wherein it is desirable to supply a liquid under pressure. It may, for example, be used as a pumping system for industrial applications.

Although the structures described in this disclosure have been related to a gas pressurization system, the structures can of course be pressurized by pumps. The advantage of the system would then reside more in the ability to exclude gas formed within the liquid itself rather than excluding a separate gas which may be lacking in the pump fed system.

Having thus described the invention and the advantages thereof, it will be understood that the invention is not to be limited to the details herein disclosed otherwise than as set forth in the claims appended hereto.

I claim:

1. A liquid propellant delivery system for rocket engines and the like comprising:
    a tank containing liquid propellant,
    means to supply gas under pressure to said tank and in contact with said propellant,
    a hollow barrier in said tank, said barrier being adapted to allow passage of liquid propellant from its interior side to its exterior side when exposed to said propellant, said barrier further being adapted to prevent passage of said gas when wetted with said propellant, said barrier being adapted to receive said pressurizing gas on its interior side thereof, and
    a propellant collecting space means defined by said tank and said barrier exterior side,
    a tube in communication with said collecting space and extending from end to end through said barrier, the walls of said tube converging from at least one end of the tube to a point intermediate the tube ends and,
    a pipe extending into said tube to admit and conduct away propellant.

2. A propellant delivery system according to claim 1 in which said barrier comprises a screen.

3. A propellant delivery system according to claim 1 in which said barrier consists essentially of a porous material.

4. A propellant delivery system according to claim 1 wherein said space is substantially annular.

5. Liquid storage and expulsion means comprising;
    tank means adapted to have liquid stored therein,
    means to provide gas under pressure in contact with the liquid in said tank means,
    barrier means associated with said tank means, said barrier means being adapted to allow passage of the liquid therethrough and further adapted to prevent flow of gas therethrough when said barrier means is wetted with said liquid, and
    means to receive liquid passing through said barrier, said means being adapted to provide sufficient back pressure to maintain less than predetermined low pressure drop across said barrier, whereby gas is precluded from passing through said barrier,
    said means to receive liquid passing through said barrier comprising,
    a second tank means, said second tank means having associated therewith a second barrier means, said second barrier means being adapted to allow passage of a liquid therethrough and further adapted to prevent flow of gas therethrough when said second barrier means is wetted with said liquid, and
    means to receive liquid flowing through said second barrier means.

6. Liquid storage and expulsion means according to claim 5 wherein said means to receive liquid flowing through said second barrier means comprises a rocket engine.

7. Liquid storage and expulsion means according to claim 5 wherein said barrier means is resiliently supported.

8. Liquid storage and expulsion means according to claim 5 wherein said barrier means is adapted to move relative to said tank means.

9. Liquid storage and expulsion means according to claim 5 wherein said moveable barrier means is deformable under gas pressure.

10. A liquid propellant delivery system for rocket engines and the like comprising:
    a tank containing liquid propellant,
    means to supply gas under pressure to said tank in contact with said propellant,
    barrier means inside said tank for allowing flow of said propellant therethrough and preventing flow of said gas therethrough when said barrier means is wetted with said propellant, said barrier means being a closed body with a propellant exit opening therein,
    discharge means in communication with said exit opening and,
    means connecting said barrier means with said discharge means for permitting said barrier to follow the propellant when the propellant moves due to attitude changes by said tank.

11. The structure set forth in claim 10 wherein:
    said connecting means including a swivel coupling and has a fixed line extending to the center of the tank where a section of it is bent into alignment with the tank axis and, a rotatable line rotatably connected to the bent section and connected to said barrier exit opening.

12. The structure set forth in claim 10 wherein:
    said connecting means is a swivel coupling, said coupling including a fixed member extending to the center of said tank, a rotatable member connected at its opposite ends to the fixed member and said barrier means, and a flexible fluid line joining said discharge means and said barrier exit opening, said line being substantially coextensive with the lengths of the fixed and rotatable members.

13. The structure as set forth in claim 10 wherein:
    a plurality of tubes are included inside said barrier, said tubes having inlet openings for receiving propellant under pressure and conducting it to said discharge means.

References Cited by the Examiner

UNITED STATES PATENTS

| | | | |
|---|---|---|---|
| 2,857,979 | 10/1958 | Van Dijck | 55—431 X |
| 2,924,359 | 2/1960 | Beremand. | |
| 3,176,882 | 4/1965 | Meermans | 222—187 |

CARLTON R. CROYLE, *Primary Examiner.*

MARK NEWMAN, *Examiner.*

D. HART, *Assistant Examiner.*